US012662075B2

(12) United States Patent
Zhang et al.

(10) Patent No.: US 12,662,075 B2
(45) Date of Patent: Jun. 23, 2026

(54) PROTECTIVE SHELL FOR VEHICLE WINCH AND WINCH ASSEMBLY

(71) Applicant: T-MAX (HANGZHOU) TECHNOLOGY CO., LTD., Hangzhou (CN)

(72) Inventors: Hanxin Zhang, Hangzhou (CN); Yiming Wang, Hangzhou (CN); Hangfei Yu, Hangzhou (CN); Ke Wang, Hangzhou (CN)

(73) Assignee: T-MAX (HANGZHOU) TECHNOLOGY, CO., LTD., Zhejiang (CN)

( * ) Notice: Subject to any disclaimer, the term of this patent is extended or adjusted under 35 U.S.C. 154(b) by 176 days.

(21) Appl. No.: 18/515,041

(22) Filed: Nov. 20, 2023

(65) Prior Publication Data

US 2024/0166152 A1 May 23, 2024

(30) Foreign Application Priority Data

Nov. 21, 2022 (CN) .......................... 202223097125.X
Nov. 21, 2022 (CN) .......................... 202223107123.4

(51) Int. Cl.
B60R 19/48 (2006.01)
B66D 1/36 (2006.01)

(52) U.S. Cl.
CPC ................ B60R 19/48 (2013.01); B66D 1/36 (2013.01)

(58) Field of Classification Search
CPC ............................ B66D 1/36–39; B60R 19/48
See application file for complete search history.

(56) References Cited

U.S. PATENT DOCUMENTS

| | | | |
|---|---|---|---|
| 1,386,052 A | 8/1921 | Duggan | |
| 1,945,702 A | 2/1934 | Pitter | |
| 2,090,445 A | 8/1937 | Hale et al. | |
| 4,103,872 A | 8/1978 | Hirasuka | |
| 4,127,295 A * | 11/1978 | Robinson ................. | B66D 1/00 254/362 |

(Continued)

FOREIGN PATENT DOCUMENTS

| | | |
|---|---|---|
| CH | 597010 A5 | 3/1978 |
| CN | 203728468 U | 2/2014 |

(Continued)

OTHER PUBLICATIONS

International Search Report of the International Searching Authority for PCT International Application No. PCT/CN2019/077842 mailed Oct. 12, 2019. (English Translation, p. 1-20).

(Continued)

*Primary Examiner* — Nathaniel L Adams
(74) *Attorney, Agent, or Firm* — Perkins Coie LLP

(57) ABSTRACT

A protective shell for a vehicle winch includes a first shell and a second shell. The first shell has a first end and a second end that are oppositely arranged in a first direction. The first end of the first shell is detachably connected to a rope guide of the vehicle winch. The first shell includes a through hole penetrating the first shell along the first direction and configured to accommodate at least a part of a buffer member of the vehicle winch. The second shell is detachably connected to the second end of the first shell to open and close the through hole.

19 Claims, 7 Drawing Sheets

(56) References Cited

U.S. PATENT DOCUMENTS

| | | | | |
|---|---|---|---|---|
| 5,048,854 | A * | 9/1991 | Clark | B60D 1/38 |
| | | | | 280/479.3 |
| 5,056,698 | A | 10/1991 | Kozakevich | |
| 5,255,767 | A | 10/1993 | Norwood | |
| 5,663,541 | A | 9/1997 | Mc Gregor, II | |
| 6,050,290 | A | 4/2000 | Zhan | |
| 6,681,507 | B1 * | 1/2004 | Lieziert | G09F 21/04 |
| | | | | 40/200 |
| 7,617,840 | B1 | 11/2009 | Zinda | |
| 8,267,379 | B2 | 9/2012 | Yang et al. | |
| 8,469,305 | B2 | 6/2013 | Feldstein et al. | |
| 8,973,902 | B2 | 3/2015 | Huang | |
| 9,388,025 | B2 * | 7/2016 | Costa | F16G 11/146 |
| 10,093,522 | B1 | 10/2018 | Baugh | |
| 10,519,012 | B1 * | 12/2019 | Hare | B66D 1/36 |
| 10,562,743 | B2 | 2/2020 | Fretz | |
| D901,821 | S | 11/2020 | Zheng | |
| 11,155,450 | B2 | 10/2021 | Fan et al. | |
| 11,485,180 | B2 | 11/2022 | Najarro | |
| 11,713,223 | B2 | 8/2023 | Zhan et al. | |
| 11,965,288 | B2 | 4/2024 | De Jager et al. | |
| 12,319,549 | B1 | 6/2025 | Liu et al. | |
| D1,094,204 | S | 9/2025 | Yu et al. | |
| 2006/0054731 | A1 | 3/2006 | Nagler | |
| 2007/0267148 | A1 | 11/2007 | Steele et al. | |
| 2008/0164364 | A1 | 7/2008 | Kaltman | |
| 2011/0065546 | A1 | 3/2011 | Xie et al. | |
| 2015/0203325 | A1 | 7/2015 | Briggs et al. | |
| 2015/0298935 | A1 | 10/2015 | Langeman | |
| 2016/0016766 | A1 * | 1/2016 | Ho | B66D 1/38 |
| | | | | 242/397.3 |
| 2016/0158584 | A1 | 6/2016 | Burke et al. | |
| 2017/0321851 | A1 | 11/2017 | Fretz et al. | |
| 2018/0118530 | A1 | 5/2018 | August | |
| 2018/0215591 | A1 | 8/2018 | Anderson | |
| 2019/0292026 | A1 | 9/2019 | Felps | |
| 2019/0300344 | A1 | 10/2019 | Cui | |
| 2020/0277169 | A1 | 9/2020 | Zhan | |
| 2020/0299116 | A1 | 9/2020 | Fan | |
| 2021/0155321 | A1 * | 5/2021 | Elliott | B63B 21/10 |
| 2022/0009756 | A1 | 1/2022 | Fan et al. | |
| 2022/0178074 | A1 | 6/2022 | Pavel | |
| 2023/0024630 | A1 | 1/2023 | Kennelly | |
| 2024/0083378 | A1 | 3/2024 | Anderson et al. | |
| 2024/0166152 | A1 | 5/2024 | Zhang et al. | |
| 2024/0351830 | A1 * | 10/2024 | Yu | B66D 1/36 |
| 2024/0351831 | A1 * | 10/2024 | Yu | B66D 1/60 |

FOREIGN PATENT DOCUMENTS

| | | | | | |
|---|---|---|---|---|---|
| CN | 104925691 | A | 9/2015 | | |
| CN | 206188291 | U | 5/2017 | | |
| CN | 206188292 | U | 5/2017 | | |
| CN | 206606959 | U | 11/2017 | | |
| CN | 107601333 | A | 1/2018 | | |
| CN | 207361653 | U | 5/2018 | | |
| CN | 207537039 | U | 6/2018 | | |
| CN | 208037900 | U | 11/2018 | | |
| CN | 208532082 | U | 2/2019 | | |
| CN | 210286571 | U | 4/2020 | | |
| CN | 112645208 | A | 4/2021 | | |
| DE | 10300960 | A1 | 7/2004 | | |
| DE | 102007044287 | A1 * | 3/2009 | | B66D 3/006 |
| GB | 2328919 | A | 3/1999 | | |
| GB | 2566315 | A * | 3/2019 | | B66D 1/12 |
| KR | 101719102 | B1 | 3/2017 | | |
| WO | 2015013790 | A1 | 2/2015 | | |
| WO | 2018110886 | A1 | 6/2018 | | |

OTHER PUBLICATIONS

U.S. Appl. No. 16/742,632 Notice of Allowance Mailed Jun. 29, 2021, pp. 1-7.

U.S. Appl. No. 16/737,667, Restriction Requirement Mailed Mar. 21, 2022, pp. 1-6.

U.S. Appl. No. 18/335,980 Non-Final Office Action Mailed Jan. 23, 2024, pp. 1-11.

U.S. Appl. No. 18/335,993, Non-Final Office Action Mailed Jan. 30, 2024, pp. 1-11.

U.S. Appl. No. 17/484,950, Non-Final Office Action mailed Feb. 21, 2024, pp. 1-12.

Chinese Application No. 201910149808.9 Office Action Mailed Dec. 1, 2023, with English Translation, pp. 1-18.

Chinese Application No. 201910149845.X, Office Action mailed Jan. 2, 2024, with English Translation, pp. 1-10.

U.S. Appl. No. 18/335,980, Notice of Allowance mailed Jun. 6, 2024, pp. 8.

U.S. Appl. No. 18/335,993, Notice of Allowance Mailed May 15, 2024, pp. 1-8.

Non-Final Office Action for U.S. Appl. No. 18/645,223, mailed on Sep. 17, 2025, 9 pages.

Non-Final Office Action for U.S. Appl. No. 18/775,958, mailed on Jan. 23, 2026, 11 pages.

* cited by examiner

PROTECTIVE SHELL FOR VEHICLE WINCH AND WINCH ASSEMBLY

CROSS-REFERENCE TO RELATED APPLICATION

This patent document claims the benefits and priority of Chinese Patent Application Nos. 202223107123.4 and 202223097125.X, both filed on Nov. 21, 2022, the entire contents of which are incorporated herein by reference.

TECHNICAL FIELD

The present disclosure relates to the field of vehicle protective devices, and more particularly to a protective shell for a vehicle winch and a winch assembly.

BACKGROUND

A vehicle winch is a tool that utilizes rotation of its own power engine to pull out a trapped vehicle through a hauling steel rope or special cable fixed at the other end. The vehicle winch includes a winch body, a rope guide, a buffer member, and a cable with a connection fastener. The winch body drives the cable to be retracted or released. The rope guide is arranged on a vehicle body to guide the cable. The buffer member is fitted over the cable and positioned between the connection fastener and the rope guide to play a buffering role. In the related art, when the vehicle winch is not in use, the buffer member is exposed on the vehicle body and is prone to damage due to impact.

SUMMARY

A protective shell according to embodiments of the present disclosure is used for a vehicle winch. The vehicle winch includes: a rope guide, a buffer member, a cable and a connection fastener. The rope guide has a guide hole through which the cable passes. The connection fastener is at an end of the cable, and the buffer member is fitted over the connection fastener. The cable, the connection fastener and the buffer member are movable in a first direction relative to the rope guide. The protective shell according to embodiments of the present disclosure includes a first shell and a second shell. The first shell has a first end and a second end that are oppositely arranged in the first direction. The first end of the first shell is detachably connected to the rope guide. The first shell includes a through hole penetrating the first shell in the first direction. The second shell is detachably connected to the second end of the first shell to open and close the through hole.

A winch assembly according to embodiments of the present disclosure includes a vehicle winch and a protective shell. The vehicle winch includes: a rope guide, a buffer member, a cable and a connection fastener. The rope guide has a guide hole through which the cable passes. The connection fastener is at an end of the cable, and the buffer member is fitted over the connection fastener. The cable, the connection fastener and the buffer member are movable in a first direction relative to the rope guide. The protective shell includes a first shell and a second shell. The first shell has a first end and a second end that are oppositely arranged in the first direction. The first end of the first shell is detachably connected to the rope guide. The first shell includes a through hole penetrating the first shell in the first direction. The second shell is detachably connected to the second end of the first shell to open and close the through hole. The rope guide is arranged on a vehicle body; an end of the rope guide facing away from the vehicle body includes a connection groove; the buffer member has a first end and a second end that are oppositely arranged in the first direction, the first end of the buffer member including a connection portion fitted with the connection groove to enable the rope guide and the buffer member to be connected in an insertion manner; the connection fastener has a first end and a second end that are oppositely arranged in the first direction, the first end of the connection fastener being connected to the cable; the connection fastener is movable in the first direction relative to the buffer member, to allow the second end of the connection fastener to extend and retract from the second end of the buffer member; the vehicle winch has a use state where the buffer member is separated from the rope guide and the second end of the connection fastener extends from the second end of the buffer member, and a rest state where the buffer member is inserted and connected to the rope guide and the second end of the connection fastener is retracted from the second end of the buffer member. The protective shell is configured to separate from the vehicle winch in the use state and being configured to connect to the vehicle winch in the rest state.

DETAILED DESCRIPTION

Figure 1:
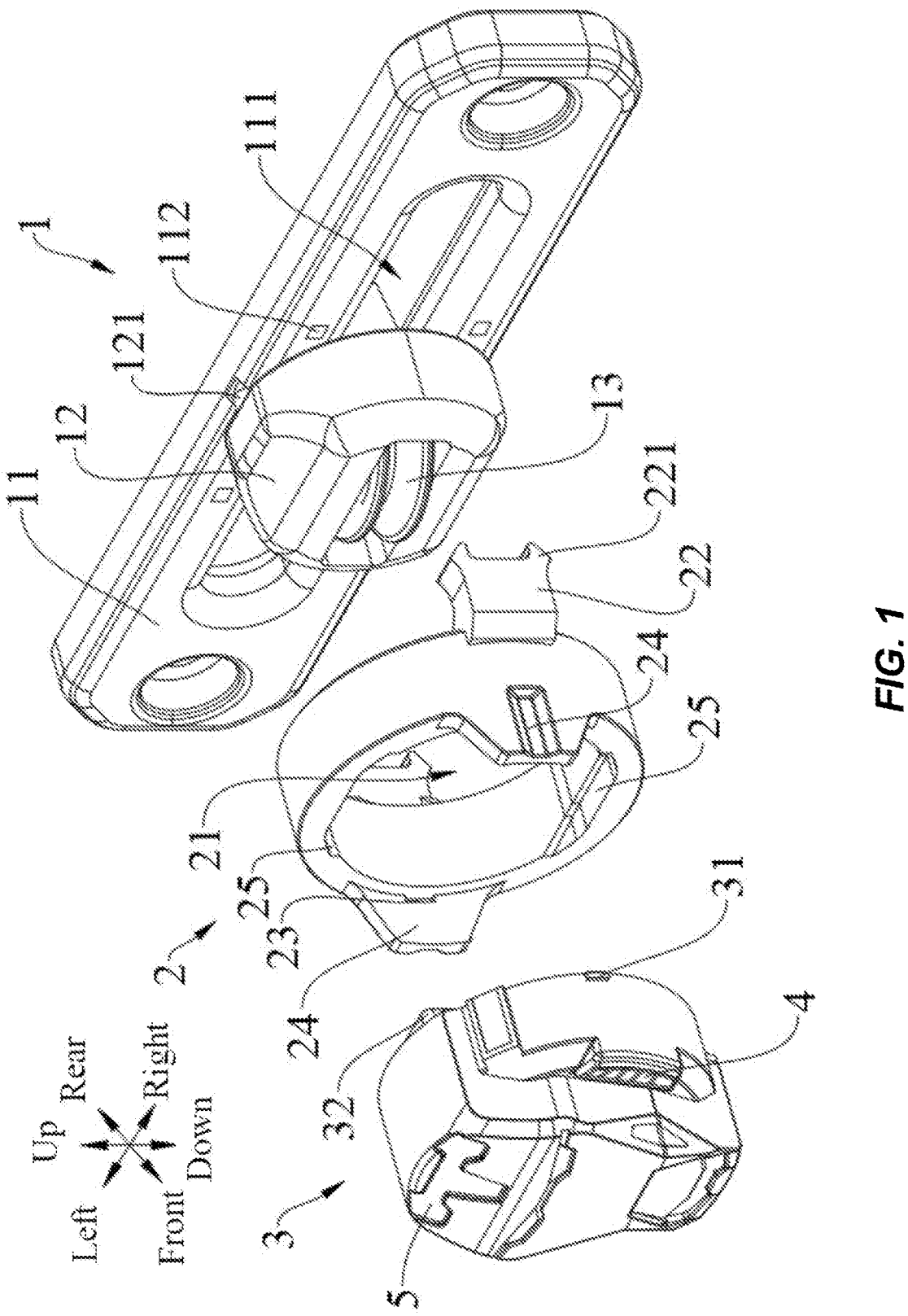
FIG. 1 is a first schematic view of a usage state of a protective shell for a vehicle winch according to embodiments of the present disclosure.

Embodiments of the present disclosure will be described in detail below and examples thereof will be shown in the drawings. The embodiments described with reference to the drawings are exemplary and are intended to illustrate rather than limit the present disclosure.

A protective shell for a vehicle winch and a winch assembly according to embodiments of the present disclosure will be described with reference to FIGS. 1 to 7.

As shown in FIGS. 1 to 7, the winch assembly according to embodiments of the present disclosure includes a vehicle winch and a protective shell.

The vehicle winch 1 includes a rope guide 11, a buffer member 12, a cable, and a connection fastener 13. The rope guide 11 includes a guide hole 111, and the cable passes through the guide hole 111. The connection fastener 13 is arranged at an end of the cable, and the buffer member 12 is fitted over the connection fastener 13. The cable, the connection fastener 13, and the buffer member 12 can move in a first direction (i.e., a front-rear direction as shown in FIG. 1) relative to the rope guide 11.

The rope guide 11 is arranged on a vehicle body, and an end of the rope guide 11 facing away from the vehicle body includes a connection groove. The buffer member 12 has a first end and a second end that are oppositely arranged in the first direction. The first end of the buffer member 12 includes a connection portion 121 that is fitted with the connection groove to enable the rope guide 11 and the buffer member 12 to be connected to each other in an insertion manner. The connection fastener 13 has a first end and a second end that are oppositely arranged in the first direction. The first end of the connection fastener 13 is connected to the cable. The connection fastener 13 is movable in the first direction relative to the buffer member 12, to allow the second end of the connection fastener 13 to extend and retract from the second end of the buffer member 12. The vehicle winch has a use state and a rest state. In the use state, the buffer member 12 is separated from the rope guide 11, and the second end of the connection fastener 13 extends from the second end of the buffer member 12. In the rest state, the buffer member 12 is inserted and connected to the rope guide 11, and the second end of the connection fastener 13 is retracted from the second end of the buffer member 12.

Specifically, as shown in FIG. 1, the rope guide 11 is preferably made of metal, the rope guide 11 is connected to the vehicle body through bolts, and a rear end of the rope guide 11 abuts against the vehicle body. The rope guide 11 includes the guide hole 111, and the guide hole 111 is preferably in the shape of a strip extending for a certain distance in a left-right direction. It can be understood that the guide hole is not limited to the strip shape, and in other embodiments, the guide hole may also be circular, square and in other shapes.

The cable passes through the guide hole 111 and is movable in the front-rear direction relative to the rope guide 11. During movement of the cable, an inner wall surface of the guide hole 111 limits a position of the cable in the left-right direction and in an up-down direction. A rear end of the cable is connected to a power engine inside the vehicle body, and the power engine rotates to retract and release the cable. A front end of the cable is connected to a rear end of the connection fastener 13. Dimensions of the connection fastener 13 in the left-right direction and in the up-down direction are smaller than those of the guide hole 111, so that the connection fastener 13 can enter and exit the guide hole 111. The connection fastener 13 is preferably annular, and a front end of the connection fastener 13 is suitable for connection with a hook. It can be understood that the connection fastener is not limited to being annular, and in other embodiments, the connection fastener may also be a buckle, as long as it can be connected with the cable and be detachably connected to the hook.

The buffer member 12 is fitted over the connection fastener 13, and an inner wall surface of the buffer member 12 has a protrusion inserted into the connection fastener 13. The buffer member 12 is preferably made of an elastic material and is configured to abut against a front end surface of the rope guide 11 when the cable and the connection fastener 13 are retracted, to play a buffering role. The buffer member 12 is slidable in the front-rear direction relative to the connection fastener 13, and a size of the buffer member 12 in the front-rear direction is smaller than a size of the connection fastener 13, so that the front end of the connection fastener 13 can extend and retract from a front end of the buffer member 12. When the connection fastener 13 retracts, the hook cannot be connected to the connection fastener 13, and when the connection fastener 13 extends, the hook can be hooked on the connection fastener 13. It should be noted that the retraction of the front end of the connection fastener from the front end of the buffer member includes at least two situations. In the first situation, the front end of the connection fastener is completely located inside the buffer member. In the second situation, a part of the front end of the connection fastener is left outside the buffer member, but this part cannot be connected to the hook. Specific situations depend on structures and models of the buffer member and the connection fastener. The rear end of the connection fastener extends from a rear end of the buffer member, and the rear end of the connection fastener passes through or is located in the guide hole.

The connection portion 121 is on a rear end surface of the buffer member 12, and the connection groove is on the front end surface of the rope guide 11 and is fitted with the connection portion 121. The connection groove is preferably arranged in a middle position of the rope guide 11 in the left-right direction. When the cable and the connection fastener 13 are retracted, the connection portion 121 is inserted into the connection groove, to allow insertion and connection between the buffer member 12 and the rope guide 11. In such a way, the buffer member 12 is fixed, and the position of the buffer member 12 relative to the rope guide 11 can be limited, restricting the position of the buffer member 12.

The vehicle winch includes the use state and the rest state. In the use state, the cable extends out of the vehicle body for a certain length. At this time, the buffer member 12 is separated from the rope guide 11, and the front end of the connection fastener 13 extends from the front end of the buffer member 12 to be connected to the hook. The power engine connected to the cable may be releasing or retracting the cable and may also be in standby after releasing the cable for a certain length. In the rest state, the cable is retracted into the vehicle body. At this time, the connection portion 121 is inserted into the connection groove, to allow the insertion and connection between the buffer member 12 and the rope guide 11. Under a pulling force of the cable, the front end of the connection fastener 13 retracts from the front end of the buffer member 12, and the pulling force of the cable is transmitted to the buffer member 12 through the connection fastener 13, so that the buffer member 12 will not be separated from the rope guide 11.

The protective shell is the protective shell for the vehicle winch according to the embodiments of the present disclosure. In the use state, the protective shell is separated from the vehicle winch; and in the rest state, the protective shell is connected to the vehicle winch.

Specifically, as shown in FIG. 1, in the use state, the protective shell is separated from the vehicle winch, so that the buffer member 12 can be separated from the rope guide 11, and the front end of the connection fastener 13 can extend from the front end of the buffer member 12.

Figure 3:
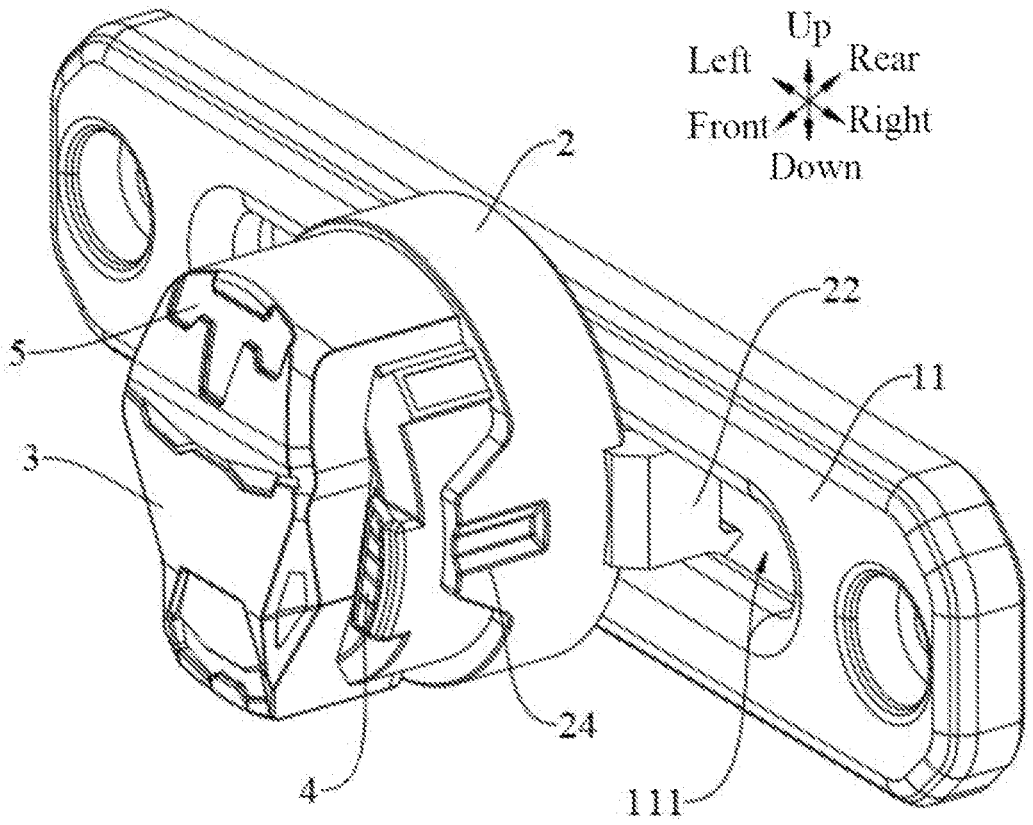
FIG. 3 is a third schematic view of the usage state of the protective shell for the vehicle winch according to embodiments of the present disclosure.

As shown in FIG. 3, in the rest state, the protective shell is connected to the vehicle winch, and the buffer member 12 is located inside the protective shell, so that the buffer member 12 is protected by the protective shell.

The winch assembly according to the embodiments of the present disclosure includes the vehicle winch and the protective shell, and the protective shell can protect the buffer member of the vehicle winch, thereby prolonging the service life of the buffer member and the vehicle winch.

Referring to FIGS. 1-7, the protective shell for the vehicle winch according to embodiments of the present disclosure will be described in detail below.

As shown in FIGS. 1-7, the protective shell for the vehicle winch according to embodiments of the present disclosure includes a first shell 2 and a second shell 3.

The first shell 2 includes a first end and a second end that are opposite to each other in the first direction. The first end of the first shell 2 is configured to be detachably connected to the rope guide 11. The first shell 2 includes a through hole 21 penetrating the first shell 2 in the first direction, and the through hole 21 is configured to accommodate at least a part of the buffer member 12. Specifically, as shown in FIGS. 1-3 and 5-7, a rear end of the first shell 2 is detachably connected to the rope guide 11, and the first shell 2 includes the through hole 21 penetrating the first shell 2 in the front-rear direction. In the rest state, the first shell 2 is connected to the rope guide 11, and at least a part of the buffer member 12 connected to the rope guide 11 is located in the through hole 21, so that the first shell 2 at least protects a lateral surface of the buffer member 12. Preferably, the through hole 21 has a circular cross-section.

The second shell 3 is detachably connected to the second end of the first shell 2, to open and close the through hole 21. Specifically, as shown in FIGS. 1-4, a rear end of the second shell 3 is detachably connected to a front end of the first shell 2, to open and close the through hole 21 through the second shell 3, and in the rest state, at least a front end surface of the buffer member 12 is protected by the second shell 3.

The protective shell for the vehicle winch according to the embodiments of the present disclosure protects the buffer member by arranging the first shell for accommodating at least a part of the buffer member and by arranging the second shell for opening and closing the through hole. The buffer member is prevented from being damaged since external force and abrasion are born by the first shell and the second shell. Meanwhile, the first shell and the second shell are detachable, and the second shell is located on a front side of the first shell, so that the second shell is more susceptible to damage and wears out faster than the first shell, and hence the second shell can be replaced separately during use. When the first shell is damaged, the first shell can also be replaced separately. As a result, the use cost of the protective shell can be reduced.

In addition, since the winch assembly also has the first shell and the second shell, the function that each of the first shell and the second shell is replaceable separately can also reduce the use cost of the winch assembly.

Regarding the connection between the first shell 2 and the rope guide 11.

In some embodiments, the first end of the first shell 2 is provided with a first plug 22, and the first plug 22 has at least two snap portions 221. The at least two snap portions 221 are spaced apart from each other in a second direction (i.e., an up-down direction as shown in FIG. 1) that is orthogonal to the first direction. The at least two snap portions 221 are movable relative to each other, to have a movable position and a connection position. In the movable position, a maximum size of the at least two snap portions 221 in the second direction is less than or equal to a size of the guide hole 111 in the second direction, so that the first plug 22 can be inserted into and removed from the guide hole 111. In the connection position, the maximum size of the at least two snap portions 221 in the second direction is greater than the size of the guide hole 111 in the second direction, so that the first shell 2 is connected to the rope guide 11 in a clamping manner.

As shown in FIGS. 1-4, the rear end of the first shell 2 is provided with a first plug 22 extending backward, and a rear end of the first plug 22 is provided with two snap portions 221 that are spaced apart from each other in the up-down direction. The first shell 2 is preferably made of a plastic material. The two snap portions 221 can deform and move close to each other under external pressure. When the external pressure disappears, the two snap portions 221 move away from each other and return to their original positions due to a restoring force of the material. As a result, the two snap portions 221 have a movable position and a connection position. In the movable position, the two snap portions 221 deform to become close to each other, and a maximum distance between an upper end surface of an upper snap portion 221 and a lower end surface of a lower snap portion 221 is smaller than a distance of the guide hole 111 in the up-down direction. At this time, the two snap portions 221 can move from front to back to be inserted into the guide hole 111, and they can move from back to front to come out of the guide hole 111. In the connection position, the two snap portions 221 are at their original positions, and the maximum distance between the upper end surface of the upper snap portion 221 and the lower end surface of the lower snap portion 221 is greater than the distance of the guide hole 111 in the up-down direction. When the two snap portions 221 are at the rear end of the rope guide 11, the first shell 2 is connected to the rope guide 11 by clamping.

In order to facilitate the clamping connection between the first shell 2 and the rope guide 11 by pressing the first shell 2 and the separation of the first shell 2 from the rope guide 11 by pulling the first shell 2 during use, the upper end surface of the upper snap portion 221 has a first inclined plane and a second inclined plane, the first inclined plane being at a front end of the second inclined plane, extending from front to back and inclining upwards, and the second inclined plane extending from back to front and inclining upwards; and the lower end surface of the lower snap portion 221 has a third inclined plane and a fourth inclined plane, the third inclined plane being at a front end of the fourth inclined plane, extending from front to back and inclining downwards, and the fourth inclined plane extending from back to front and inclining downwards. When the first shell 2 is pressed, the first inclined plane and the third inclined plane abut against a hole wall surface of the guide hole 111, and the upper snap portion 221 and the lower snap portion 221 are driven to become close to each other under the pressure of the hole wall surface. When the first shell 2 is pulled, the second inclined plane and the fourth inclined plane abut against the hole wall surface of the guide hole 111, and the upper snap portion 221 and the lower snap portion 221 are driven to become close to each other under the pressure of the hole wall surface.

It can be understood that the structures of the first plug and the snap portions is not limited to those shown in FIG. 1. In other embodiments, the relative movement of the two snap portions is not caused by the material deformation. The two snap portions are hinged, and an elastic member is connected between the two snap portions and drives the two snap portions to move away from each other. The two snap portions become close to each other when subjected to external pressure.

In some embodiments, there are at least two first plugs 22, and at least two first plugs 22 are spaced apart from each other in a third direction (a left-right direction as shown in FIG. 1), the first direction and the second direction being orthogonal to the third direction.

Figure 4:
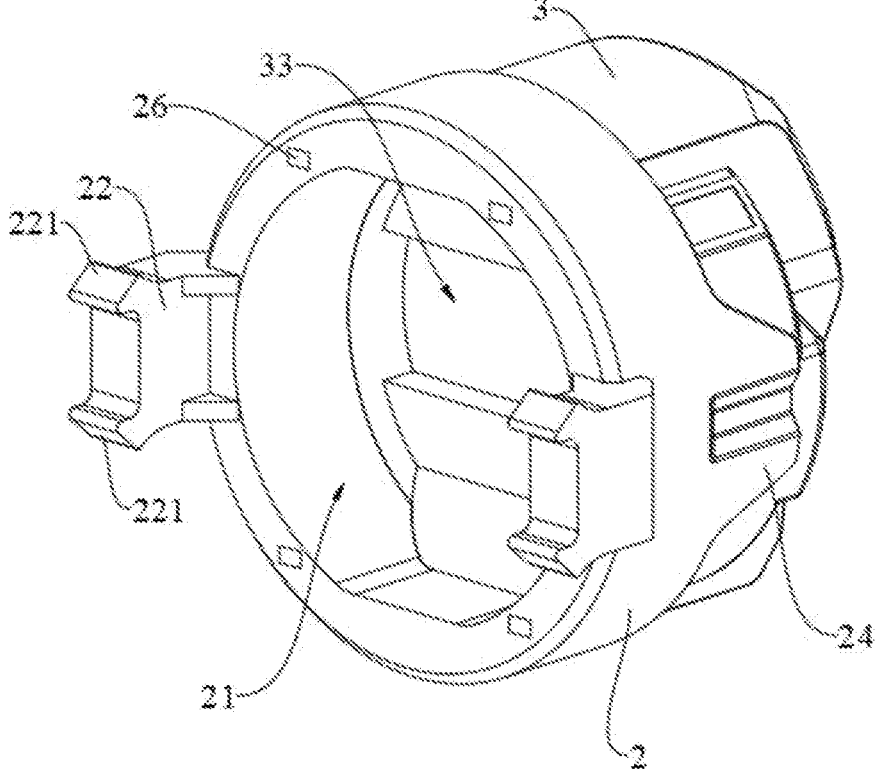
FIG. 4 is a structural schematic view of a protective shell for a vehicle winch according to embodiments of the present disclosure.

As shown in FIG. 4, the first shell 2 has two first plugs 22, and the two first plugs 22 are spaced apart from each other in the left-right direction to improve the stability of the connection between the first shell 2 and the rope guide 11.

It can be understood that the first shell and the rope guide are not limited to being connected by clamping.

In other embodiments, the first shell and the rope guide can also be detachably connected through a threaded structure. For example, a front end of the rope guide is provided with an annular protruding portion, an inner peripheral surface of the protruding portion includes internal threads, and an outer peripheral surface of the first shell includes external threads fitted with the internal threads.

Figure 5:
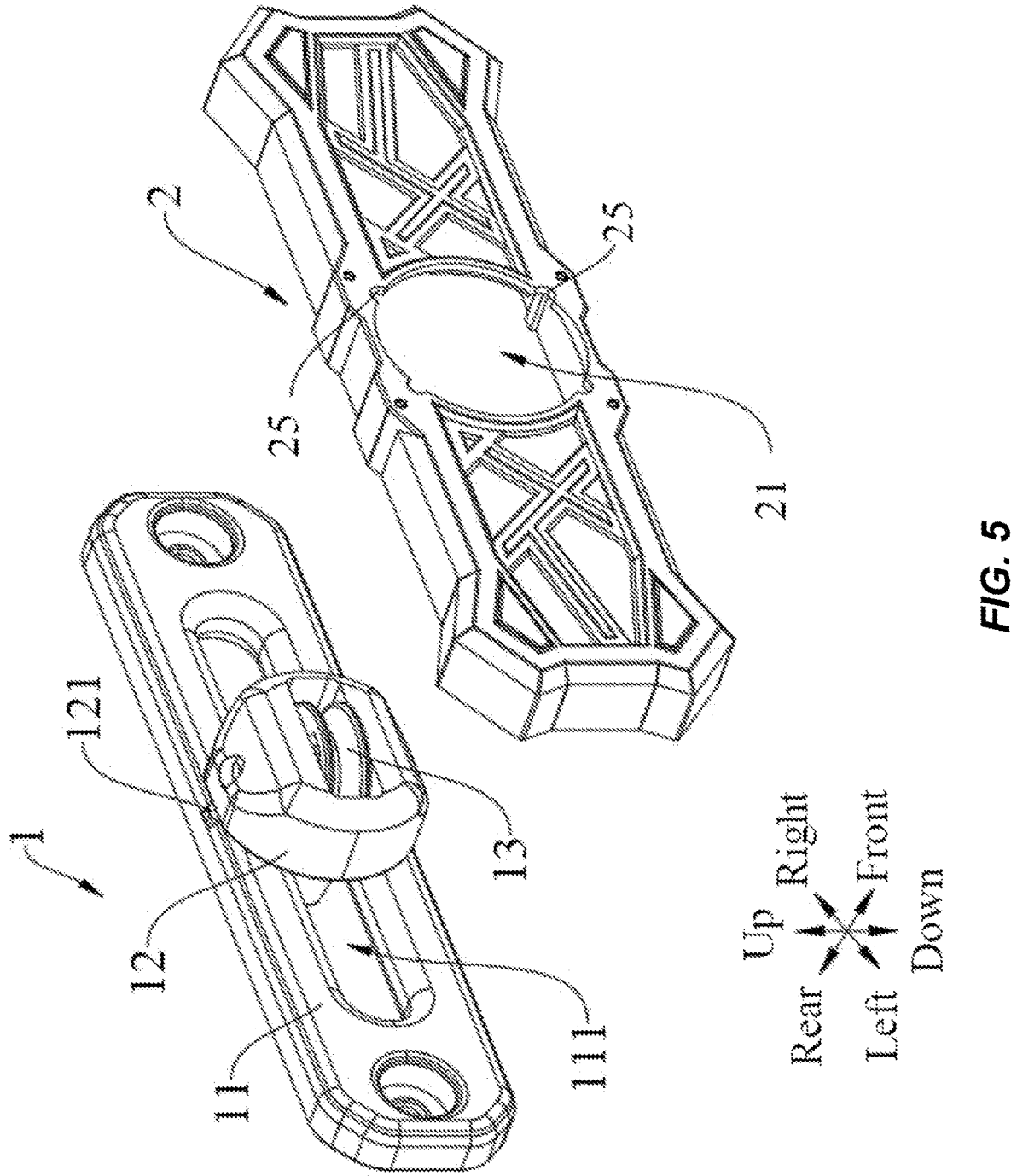
FIG. 5 is a structural schematic view of a first shell of a protective shell for a vehicle winch according to embodiments of the present disclosure.
Figure 6:
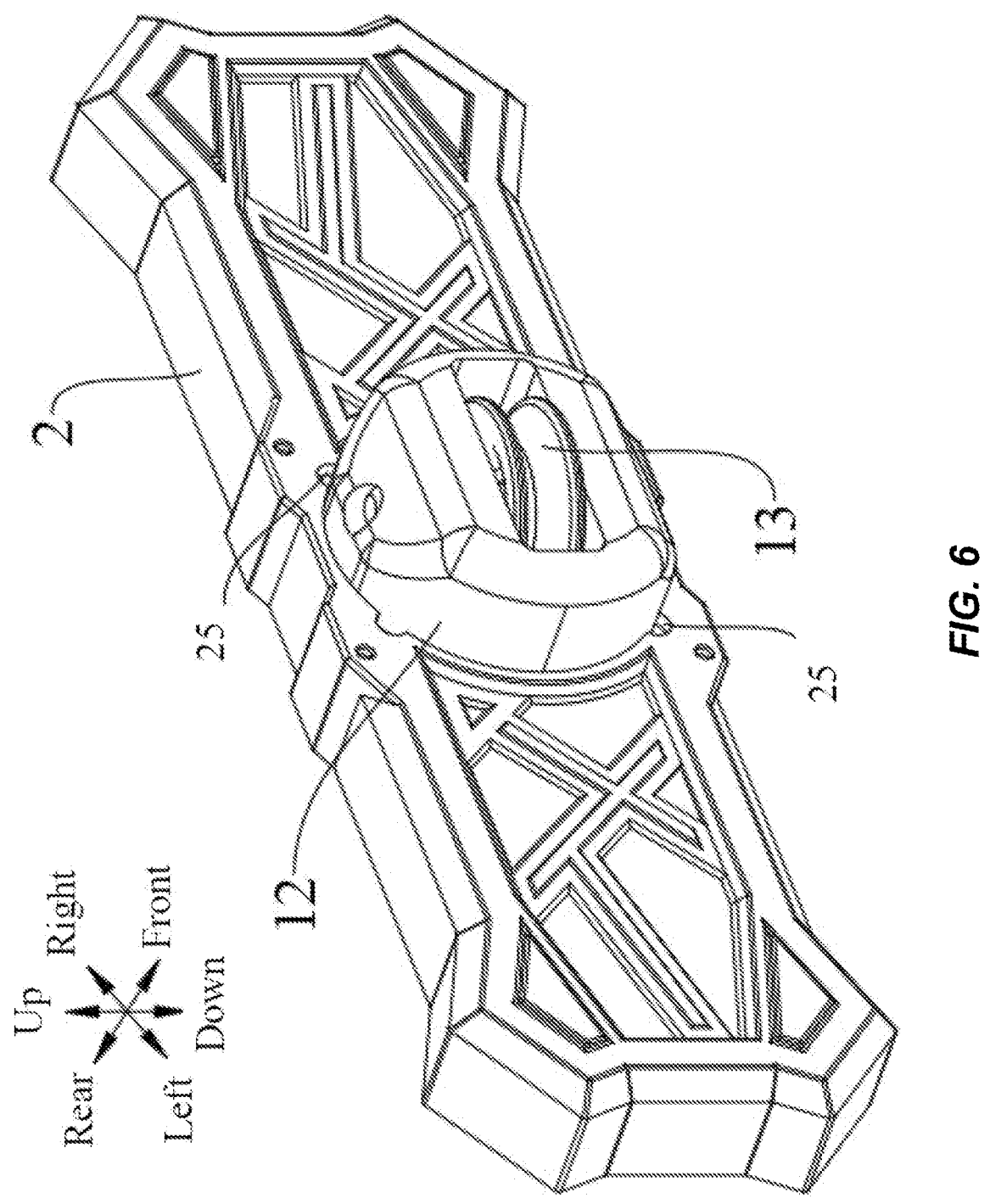
FIG. 6 is a schematic view of an assembly state of the first shell in FIG. 5 and the vehicle winch.
Figure 7:
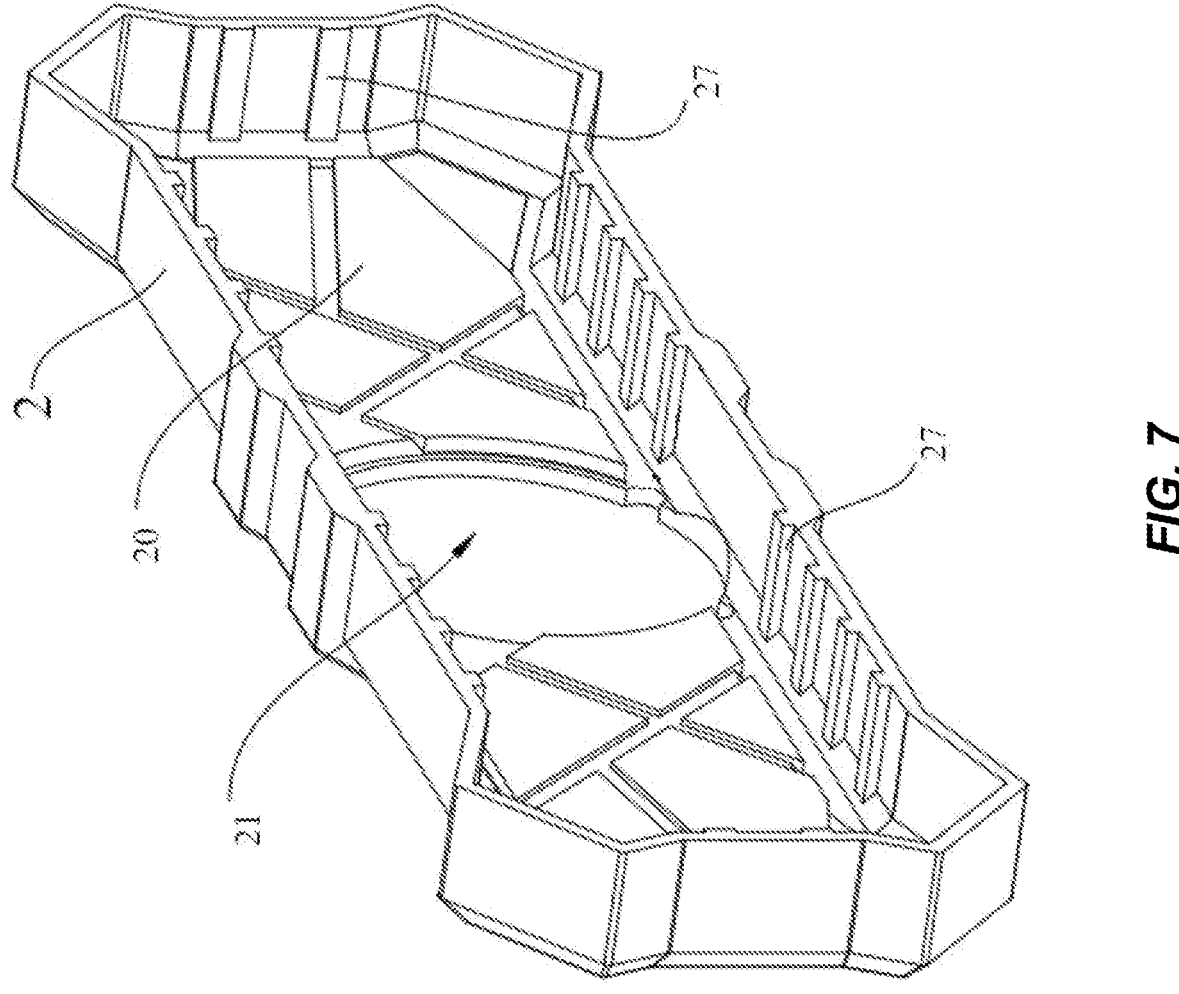
FIG. 7 is a rear view of the first shell in FIG. 5.

In other embodiments, referring to FIGS. 5 to 7, the first shell 2 is detachably connected to the rope guide 11 in an insertion manner. An end surface of the first end (i.e., the rear end) of the first shell 2 has an accommodation cavity 20, and the accommodation cavity 20 is in the shape of a strip extending for a certain distance in the left-right direction, to allow the accommodation cavity 20 to accommodate the rope guide 11, so that the rope guide 11 is connected to the first shell 2 by insertion. The through hole 21 of the first shell 2 is in the middle of the first shell 2 in the left-right direction. In the rest state, the rope guide 11 is connected to the first shell 2, and the buffer member 12 on the rope guide 11 is inserted in the through hole 21. The first shell 2 accommodates the rope guide 11 in the accommodation cavity 20 to protect the rope guide 11. Since the rear end of the buffer member 12 is connected to the rope guide 11, a small part of the buffer member 12 is located in the accommodation cavity 20 and the through hole 21, and a major part of the buffer member 12 is located in the through hole 21.

An inner wall surface of the first shell 2 includes an inner end surface and an inner lateral surface. The through hole 21 is in the inner end surface. The inner lateral surface surrounds the accommodation cavity 20. The inner lateral surface is provided with a protrusion 27 for abutting against the rope guide 11.

In some embodiments, there are a plurality of protrusions 27, and the protrusions 27 are spaced apart from each other along a surrounding direction of the inner lateral surface.

As shown in FIG. 4, the inner wall surface of the first shell 2 includes the inner end surface and the inner lateral surface. The inner end surface is orthogonal to the front-rear direction, and the through hole 21 is in the inner end surface. The inner lateral surface surrounds the accommodation cavity 20. The inner lateral surface can be divided into an upper inner lateral surface, a lower inner lateral surface, a left inner lateral surface, and a right inner lateral surface according to orientations. The upper inner lateral surface and the lower inner lateral surface are spaced apart from each other in the up-down direction. The left inner lateral surface and the right inner lateral surface are connected between the upper inner lateral surface and the lower inner lateral surface and are spaced apart from each other in the left-right direction. The inner lateral surface is provided with the protrusion 27. Preferably, the upper inner lateral surface, the lower inner lateral surface, the left inner lateral surface and the right inner lateral surface are each provided with a plurality of protrusions 27. The plurality of protrusions 27 on the upper inner lateral surface and the lower inner lateral surface are spaced apart from each other in the left-right direction. The plurality of protrusions 27 on the left inner lateral surface and the right inner lateral surface are spaced apart from each other in the up-down direction. An end surface of each protrusion 27 is configured to abut against an outer wall surface of the rope guide 11. In such a way, the first shell 2 can be connected to the rope guide 11 in the insertion manner, and the stability of the connection between the first shell 2 and the rope guide 11 can be improved.

It can be understood that the structure of the first shell is not limited to that the upper inner lateral surface, the lower inner lateral surface, the left inner lateral surface and the right inner lateral surface are each provided with the plurality of protrusions 27. In other embodiments, it is possible that only the upper inner lateral surface and the lower inner lateral surface are provided with the plurality of protrusions 27, or only the left inner lateral surface and the right inner lateral surface are provided with the plurality of protrusions 27.

It can be understood that the structure of the first shell is not limited to being provided with the protrusions 27. In other embodiments, a cross-sectional shape of the accommodation cavity 20 is fitted with a cross-sectional shape of the rope guide 11, and the inner lateral surface of the first shell abuts against a lateral surface of the rope guide, to allow the insertion connection between the first shell and the rope guide.

Regarding the connection between the first shell 2 and the second shell 3.

In some embodiments, an outer wall surface of the second shell 3 is provided with a second plug 31, and an extension direction of the second plug 31 is orthogonal to the first direction. The inner wall surface of the first shell 2 is provided with a slot 23, and the second plug 31 is inserted into the slot 23 when the first shell 2 and the second shell 3 are connected.

Figure 2:
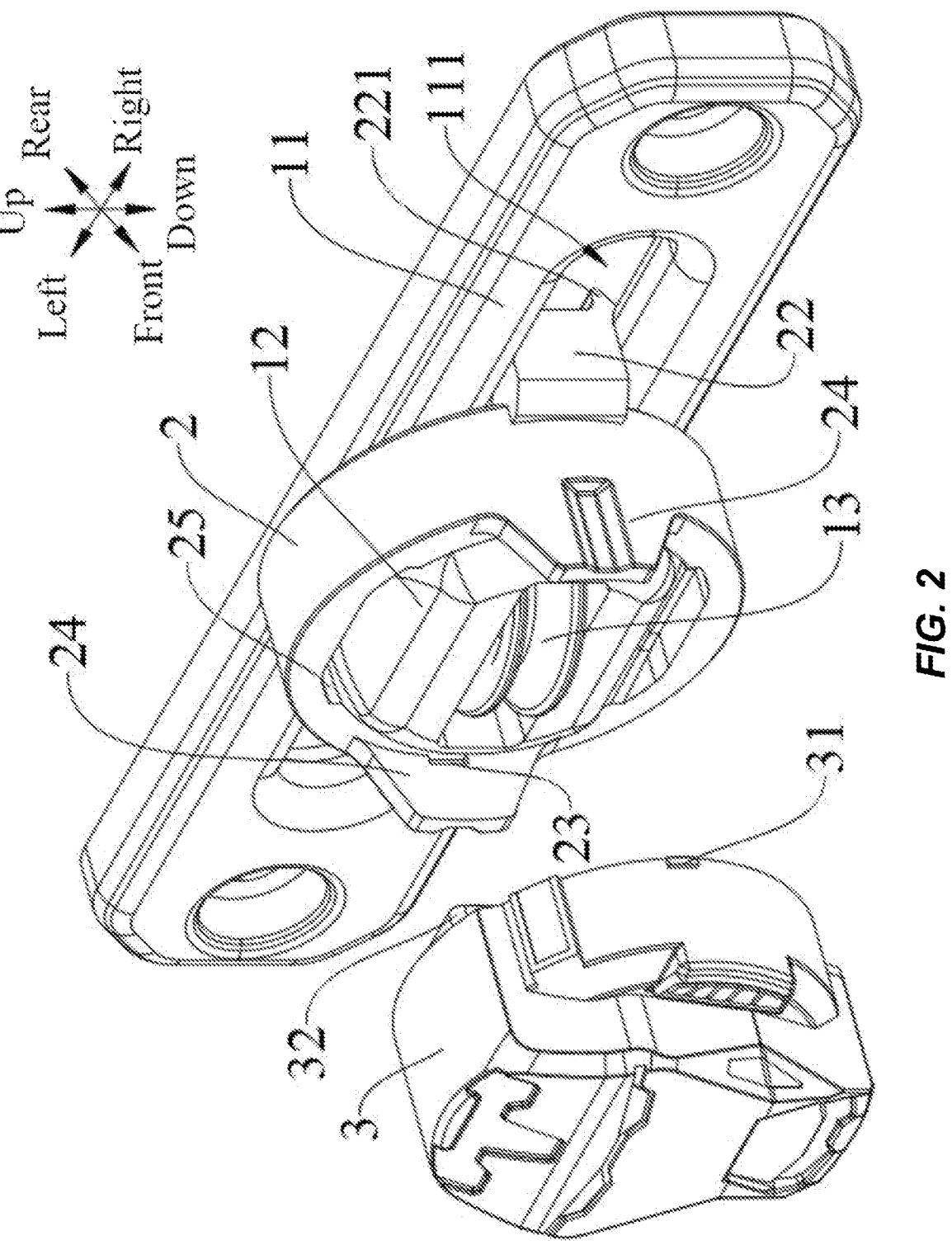
FIG. 2 is a second schematic view of the usage state of the protective shell for the vehicle winch according to embodiments of the present disclosure.

As shown in FIGS. 1-3, the second plug 31 is arranged on the outer wall surface of the second shell 3 and extends in the left-right direction; the slot 23 is in the inner wall surface of the first shell 2; and the second plug 31 is fitted with the slot 23 to allow the first shell 2 and the second shell 3 to be connected in an insertion manner.

It can be understood that the second plug is not limited to extending in the left-right direction, and in other embodiments, the second plug can extend in the up-down direction.

It can be understood that the second shell and the first shell are not limited to the insertion connection. In other embodiments, the second shell and the first shell can be detachably connected through a threaded structure. For example, an inner peripheral surface of the second shell has internal threads, and the outer peripheral surface of the first shell has external threads fitted with the internal threads.

In some embodiments, there are at least two second plugs 31, the second end of the first shell 2 has lugs 24 protruding along the first direction, and the slot 23 is in an inner wall surface of each lug 24. There are at least two lugs 24 spaced apart from each other in a direction orthogonal to the first direction. The at least two second plugs 31 are connected to the at least two lugs 24 in one-to-one correspondence.

As shown in FIGS. 1 and 2, a front end surface of the first shell 2 has two lugs 24 spaced apart from each other in the left-right direction, and end surfaces, facing each other, of the two lugs 24 have the slots 23. In other words, an inner wall face of each lug 24 facing a center line of the first shell 2 is provided with the slot 23. A left end surface of the second shell 3 is provided with one second plug 31, and a right end surface of the second shell 3 is provided with another second plug 31. The two second plugs 31 are arranged in one-to-one correspondence with the two slots 23, to improve the stability of the connection between the first shell 2 and the second shell 3. Meanwhile, when the first shell 2 and the second shell 3 are connected, the second shell 3 is located between the two lugs 24 and hence the lugs 24 also play a role in limiting the second shell 3.

In some embodiments, an end surface of the second end of the first shell 2 is provided with a positioning groove 25;

the second shell 3 is provided with a positioning portion 32 extending in the first direction; and the positioning portion 32 is configured to be inserted into the positioning groove 25.

As shown in FIG. 1 and FIG. 2, the front end surface of the first shell 2 is provided with two positioning grooves 25 that are in connection with the through hole 21. The two positioning grooves 25 are spaced apart from each other in the up-down direction. A rear end surface of the second shell 3 is provided with two protruding positioning portions 32 that are configured to be fitted with the positioning grooves 25. In such a way, the two positioning portions 32 can be inserted into the two positioning grooves 25 in one-to-one correspondence, and the positioning portions 32 and the positioning grooves 25 have guiding and positioning effects during movement of the second shell 3, which facilitates the connection between the second shell 3 and the first shell 2, and prevents the second shell 3 from rotating around the front-rear direction relative to the first shell 2.

It can be understood that in other embodiments, the protective shell may not have the positioning groove or the positioning portion.

In some embodiments, the second shell 3 has an accommodation groove 33 along the first direction. When the second shell 3 is connected to the first shell 2, the through hole 21 is in connection with the accommodation groove 33, and the accommodation groove 33 can accommodate a part of the buffer member 12 and/or a part of the connection fastener 13.

As shown in FIG. 4, the rear end surface of the second shell 3 is provided with the accommodation groove 33. When the second shell 3 is connected to the first shell 2, the accommodation groove 33 is at a front end of the through hole 21 and in connection with the through hole 21. As shown in FIG. 2, when the first shell 2 is connected to the rope guide 11, the front end of the buffer member 12 extends out of the through hole 21, and a part of the front end of the connection fastener 13 remains outside the buffer member 12. Therefore, when the second shell 3 is connected to the first shell 2, the front end of the buffer member 12 and the part of the front end of the connection fastener 13 that remains outside the buffer member 12 are located in the accommodation groove 33 to be protected by the second shell 3.

It can be understood that the structure of the second shell is not limited to that shown in FIG. 4. In other embodiments, when the front end of the buffer member extends out of the through hole and the front end of the connection fastener is located inside the buffer member, the accommodation groove only accommodates the front end of the buffer member; alternatively, when the front end of the buffer member is also located in the through hole, the second shell does not need to include any accommodation groove.

In some embodiments, the protective shell according to the embodiments of the present disclosure further includes a first sensing device and a warning lamp 4. The first sensing device is arranged in the second shell 3 to sense obstacles. The warning lamp 4 is arranged on the second shell 3 and electrically connected to the first sensing device. The first sensing device has a preset warning distance, and the warning lamp 4 is turned on when an obstacle distance sensed by the first sensing device is less than the preset warning distance.

As shown in FIGS. 1-3, the first sensing device is arranged inside the second shell 3. The first sensing device may be a sensor or an induction radar. The first sensing device is configured to sense whether there is an obstacle in front of the second shell 3 and obtain a distance between the obstacle and the second shell 3. The warning lamp 4 is arranged on the outer wall surface of the second shell 3 and electrically connected to the first sensing device. The first sensing device has the preset warning distance. When the first sensing device senses that there is an obstacle, and the distance between the obstacle and the second shell 3 is smaller than the preset warning distance, the first sensing device sends a signal to the warning lamp 4 to trigger the warning lamp 4, and the warning lamp 4 is turned on to give an alert. The first sensing device may also be connected to a vehicle-mounted computer to display warning information on a vehicle-mounted screen.

It can be understood that in other embodiments, the protective shell may not include the first sensing device and the warning lamp.

In some embodiments, the protective shell according to the embodiments of the present disclosure further includes an illumination lamp 5 on the second shell 3.

As shown in FIGS. 1-3, the illumination lamp 5 is arranged on the outer wall surface of the second shell 3. The illumination lamp 5 is configured to emit illumination light, which can play an illuminating role. Moreover, the light from the illumination lamp 5 makes it convenient to find the second shell 3 in a dark environment.

It can be understood that in other embodiments, the protective shell may not have the illumination lamp.

In some embodiments, the protective shell according to the embodiments of the present disclosure further includes a camera on the second shell 3, to obtain environmental images in front of the second shell 3 through the camera, thereby recording and displaying the environment in real time.

In some embodiments, the second shell 3 has a first charging interface, and the first charging interface is electrically connected to at least one of the first sensing device, the warning lamp 4, and/or the illumination lamp 5. The second end of the first shell 2 has a second charging interface. The first charging interface is arranged corresponding to the second charging interface in the first direction when the first shell 2 and the second shell 3 are connected. The first end of the first shell 2 has a third charging interface 26 electrically connected to the second charging interface. The rope guide 11 has a fourth charging interface 112. The third charging interface 26 is arranged corresponding to the fourth charging interface 112 in the first direction when the rope guide 11 and the first shell 2 are connected.

As shown in FIG. 1 and FIG. 4, the rear end surface of the second shell 3 includes a first charging interface. There may be one first charging interface that is electrically connected to the first sensing device, the warning lamp 4 and the lighting light 5 at the same time. Alternatively, there are a plurality of first charging interfaces that are electrically connected to the first sensing device, the warning lamp 4 and the lighting light 5 in one-to-one correspondence. Alternatively, each of the plurality of first charging interfaces is electrically connected to the first sensing device, the warning lamp 4 and the illumination lamp 5 at the same time. The front end surface of the first shell 2 includes a second charging interface. When the first shell 2 and the second shell 3 are connected, the first charging interface communicates with or is connected to the second charging interface in one-to-one correspondence. A rear end surface of the first shell 2 includes a third charging interface 26 that is electrically connected to the second charging interface in one-to-one correspondence. The front end surface of the rope guide 11 includes a fourth charging interface 112. When the rope guide 11 and the first shell 2 are connected, the fourth charging interface 112 communicates with or is connected to the third charging interface 26 in one-to-one correspondence. The fourth charging interface 112 is electrically connected to a vehicle-mounted power supply, so that power of the vehicle-mounted power supply is supplied to the first sensing device, the warning lamp 4 and the illumination lamp 5 through the fourth charging interface 112, the third charging interface 26, the second charging interface and the first charging interface in sequence. In other embodiments, the fourth charging interface, the third charging interface, the second charging interface and the first charging interface may also be terminals or may be holes through which wires pass.

It can be understood that the first charging interface is not limited to being electrically connected to the first sensing device, the warning lamp and the illumination lamp at the same time. In other embodiments, the warning lamp and the illumination lamp have their own power supplies, and at this time, the first charging interface is only electrically connected to the first sensing device.

It can be understood that the protective shell is not limited to having the fourth charging interface, the third charging interface, the second charging interface and the first charging interface. In other embodiments, a power supply is arranged inside the second shell and is electrically connected to the first sensing device, the warning lamp and the illumination lamp, so it is unnecessary to provide the fourth charging interface, the third charging interface, the second charging interface and the first charging interface.

The present disclosure aims to solve one of the technical problems in the related art at least to some extent. Therefore, embodiments of the present disclosure propose a protective shell for a vehicle winch. The protective shell protects a buffer member by a first shell and a second shell from being damaged.

Embodiments of the present disclosure also propose a winch assembly.

A protective shell according to embodiments of the present disclosure is used for a vehicle winch. The vehicle winch includes: a rope guide, a buffer member, a cable and a connection fastener, the rope guide having a guide hole through which the cable passes, the connection fastener being at an end of the cable, the buffer member being fitted over the connection fastener, and the cable, the connection fastener and the buffer member being movable in a first direction relative to the rope guide.

The protective shell according to embodiments of the present disclosure includes: a first shell having a first end and a second end that are oppositely arranged in the first direction, in which the first end of the first shell is detachably connected to the rope guide, and the first shell includes a through hole penetrating the first shell in the first direction; and a second shell detachably connected to the second end of the first shell to open and close the through hole.

The protective shell for the vehicle winch according to the embodiments of the present disclosure protects the buffer member by arranging the first shell for accommodating at least a part of the buffer member and by arranging the second shell for opening and closing the through hole. The buffer member is prevented from being damaged since external force and abrasion are born by the first shell and the second shell. Meanwhile, the first shell and the second shell are detachable, and one of them can be replaced according to different damage conditions during use, to reduce the cost of using the protective shell.

In some embodiments, the first end of the first shell includes a first plug, and the first plug has at least two snap portions spaced apart from each other in a second direction orthogonal to the first direction. The at least two snap portions are movable relative to each other have a movable position and a connection position. In the movable position, a maximum size of the at least two snap portions in the second direction is less than or equal to a size of the guide hole in the second direction, to allow the first plug to be inserted into or removed from the guide hole. In the connection position, the maximum size of the at least two snap portions in the second direction is greater than the size of the guide hole in the second direction, to allow the first shell to be connected to the rope guide in a clamping manner.

In some embodiments, there are at least two first plugs spaced apart from each other in a third direction, and the third direction is orthogonal to the first direction and the second direction.

In some embodiments, an end surface of the first end of the first shell includes an accommodation cavity configured to accommodate the rope guide, realizing an insertion connection between the rope guide and the first shell, and the through hole is configured to allow at least a part of the buffer member to pass through.

In some embodiments, an inner wall surface of the first shell includes an inner end surface and an inner lateral surface, the through hole is in the inner end surface, the inner lateral surface surrounds the accommodation cavity, and the inner lateral surface is provided with a protrusion configured to abut against the rope guide.

In some embodiments, there are a plurality of protrusions spaced apart from each other along a surrounding direction of the inner lateral surface.

In some embodiments, an outer wall surface of the second shell is provided with a second plug, and an extension direction of the second plug is orthogonal to the first direction; and an inner wall surface of the first shell is provided with a slot, and the second plug is inserted into the slot when the first shell and the second shell are connected.

In some embodiments, there are at least two second plugs; the second end of the first shell has at least two lugs protruding along the first direction and spaced apart from each other in a direction orthogonal to the first direction, and the slot is in an inner wall surfaces of each lug; and the at least two second plugs are configured to be connected to the at least two lugs in one-to-one correspondence.

In some embodiments, an end surface of the second end of the first shell includes a positioning groove; the second shell includes a positioning portion extending in the first direction; and the positioning portion is configured to be inserted into the positioning groove.

In some embodiments, the second shell includes an accommodation groove along the first direction; and when the second shell is connected to the first shell, the through hole is in connection with the accommodation groove, and the accommodation groove accommodates a part of at least one of the buffer member or the connection fastener.

In some embodiments, the protective shell further includes: a first sensing device arranged in the second shell and configured to sense an obstacle; and a warning lamp arranged on the second shell and electrically connected to the first sensing device. The first sensing device has a preset warning distance, and the first sensing device is configured to be turned on when an obstacle distance sensed by the first sensing device is less than the preset warning distance; and/or the protective shell further includes an illumination lamp arranged on the second shell.

In some embodiments, the second shell has a first charging interface electrically connected to at least one of the first sensing device, the warning lamp, and/or the illumination light; the second end of the first shell has a second charging interface that is corresponding to the first charging interface in the first direction when the first shell and the second shell are connected; the first end of the first shell has a third charging interface electrically connected to the second charging interface; and the rope guide has a fourth charging interface that is corresponding to the third charging interface in the first direction when the rope guide and the first shell are connected.

A winch assembly according to embodiments of the present disclosure includes the vehicle winch according to any one of the above embodiments and the protective shell according to any one of the above embodiments. The rope guide is arranged on a vehicle body; an end of the rope guide facing away from the vehicle body includes a connection groove; the buffer member has a first end and a second end that are oppositely arranged in the first direction, the first end of the buffer member including a connection portion fitted with the connection groove to enable the rope guide and the buffer member to be connected in an insertion manner; the connection fastener has a first end and a second end that are oppositely arranged in the first direction, the first end of the connection fastener being connected to the cable; the connection fastener is movable in the first direction relative to the buffer member, to allow the second end of the connection fastener to extend and retract from the second end of the buffer member; the vehicle winch has a use state where the buffer member is separated from the rope guide and the second end of the connection fastener extends from the second end of the buffer member, and a rest state where the buffer member is inserted and connected to the rope guide and the second end of the connection fastener is retracted from the second end of the buffer member. The protective shell is configured to separate from the vehicle winch in the use state and being configured to connect to the vehicle winch in the rest state.

The winch assembly according to embodiments of the present disclosure includes the vehicle winch and the protective shell. The protective shell can protect the buffer member of the vehicle winch to prolong the service life of the buffer member and the vehicle winch. Meanwhile, the first shell and the second shell of the protective shell are detachable, and one of them can be replaced according to different damage conditions during use, to reduce the cost of using the protective shell and the winch assembly.

In the specification, it is to be understood that terms such as "upper," "lower," "front," "rear," "left," "right," "inner," "outer" and the like should be construed to refer to the orientation as then described or as shown in the drawings under discussion. These relative terms are for convenience of description and do not require that the present disclosure have a particular orientation and be constructed or operated in a particular orientation. Thus, these terms cannot be understood as limitation on the present disclosure.

In addition, terms such as "first" and "second" are used herein for purposes of distinguishing and are not intended to indicate or imply relative importance or significance, or implicitly indicate the number of technical features indicated. Therefore, the features defined as "first" and "second" can explicitly or implicitly include at least one of these features. In the description of the present disclosure, the term "a plurality of" means at least two, such as two, three, etc., unless otherwise specifically defined.

In the present disclosure, unless specified or limited otherwise, terms "mounted," "connected," "coupled," "fixed" and the like are used broadly, and may be, for example, fixed connections, detachable connections, or integral connections; may also be mechanical or electrical connections; may also mean communicate with each other; may also be direct connections or indirect connections via intervening structures; may also be inner connection or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Moreover, those skilled in the art can combine and unite different embodiments or examples as well as features in different embodiments and examples.

Although some embodiments have been shown and described above, it would be appreciated by those skilled in the art that the above embodiments are exemplary and cannot be construed to limit the present disclosure, and changes, modifications, alternatives and variations fall into the scope of the present disclosure.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A protective shell for a vehicle winch, the vehicle winch comprising a rope guide, a buffer member, a cable and a connection fastener, the rope guide having a guide hole through which the cable passes, the connection fastener being at an end of the cable, the buffer member being fitted over the connection fastener, and the cable, the connection fastener and the buffer member being movable in a first direction relative to the rope guide, wherein the protective shell comprises:

a first shell having a first end and a second end that are oppositely arranged in the first direction, wherein the first end of the first shell is detachably connected to the rope guide, and the first shell comprises a through hole penetrating the first shell in the first direction; and a second shell detachably connected to the second end of the first shell to open and close the through hole, wherein an end surface of the first end of the first shell comprises an accommodation cavity configured to accommodate the rope guide, realizing an insertion connection between the rope guide and the first shell, and the through hole is configured to allow at least a part of the buffer member to pass through.

2. The protective shell according to claim 1, wherein an inner wall surface of the first shell comprises an inner end surface and an inner lateral surface, the through hole is in the inner end surface, the inner lateral surface surrounds the accommodation cavity, and the inner lateral surface is provided with a protrusion configured to abut against the rope guide.

3. The protective shell according to claim 2, wherein there are a plurality of protrusions spaced apart from each other along a surrounding direction of the inner lateral surface.

4. A protective shell for a vehicle winch, the vehicle winch comprising a rope guide, a buffer member, a cable and a connection fastener, the rope guide having a guide hole through which the cable passes, the connection fastener being at an end of the cable, the buffer member being fitted over the connection fastener, and the cable, the connection fastener and the buffer member being movable in a first direction relative to the rope guide, wherein the protective shell comprises:

a first shell having a first end and a second end that are oppositely arranged in the first direction, wherein the first end of the first shell is detachably connected to the rope guide, and the first shell comprises a through hole penetrating the first shell in the first direction; and a second shell detachably connected to the second end of the first shell to open and close the through hole, wherein:

an outer wall surface of the second shell is provided with a second plug, and an extension direction of the second plug is orthogonal to the first direction; and an inner wall surface of the first shell is provided with a slot, and the second plug is inserted into the slot when the first shell and the second shell are connected.

5. The protective shell according to claim 4, wherein:

there are at least two second plugs;

the second end of the first shell has at least two lugs protruding along the first direction and spaced apart from each other in a direction orthogonal to the first direction, and the slot is in an inner wall surfaces of each lug; and the at least two second plugs are configured to be connected to the at least two lugs in one-to-one correspondence.

6. The protective shell according to claim 4, wherein an end surface of the second end of the first shell comprises a positioning groove; the second shell comprises a positioning portion extending in the first direction; and the positioning portion is configured to be inserted into the positioning groove.

7. A protective shell for a vehicle winch, the vehicle winch comprising a rope guide, a buffer member, a cable and a connection fastener, the rope guide having a guide hole through which the cable passes, the connection fastener being at an end of the cable, the buffer member being fitted over the connection fastener, and the cable, the connection fastener and the buffer member being movable in a first direction relative to the rope guide, wherein the protective shell comprises:

a first shell having a first end and a second end that are oppositely arranged in the first direction, wherein the first end of the first shell is detachably connected to the rope guide, and the first shell comprises a through hole penetrating the first shell in the first direction; and a second shell detachably connected to the second end of the first shell to open and close the through hole, wherein:

the second shell comprises an accommodation groove along the first direction; and when the second shell is connected to the first shell, the through hole is in connection with the accommodation groove, and the accommodation groove accommodates a part of at least one of the buffer member or the connection fastener.

8. A protective shell for a vehicle winch, the vehicle winch comprising a rope guide, a buffer member, a cable and a connection fastener, the rope guide having a guide hole through which the cable passes, the connection fastener being at an end of the cable, the buffer member being fitted over the connection fastener, and the cable, the connection fastener and the buffer member being movable in a first direction relative to the rope guide, wherein the protective shell comprises:

a first shell having a first end and a second end that are oppositely arranged in the first direction, wherein the first end of the first shell is detachably connected to the rope guide, and the first shell comprises a through hole penetrating the first shell in the first direction; and a second shell detachably connected to the second end of the first shell to open and close the through hole, further comprising:

a first sensing device arranged in the second shell and configured to sense an obstacle; and a warning lamp arranged on the second shell and electrically connected to the first sensing device, wherein the first sensing device has a preset warning distance, and the first sensing device is configured to be turned on when an obstacle distance sensed by the first sensing device is less than the preset warning distance.

9. The protective shell according to claim 8, further comprising an illumination lamp arranged on the second shell.

10. The protective shell according to claim 9, wherein:

the second shell has a first charging interface electrically connected to at least one of the first sensing device, the warning lamp, or the illumination lamp;

the second end of the first shell has a second charging interface that is corresponding to the first charging interface in the first direction when the first shell and the second shell are connected;

the first end of the first shell has a third charging interface electrically connected to the second charging interface; and the rope guide has a fourth charging interface that is corresponding to the third charging interface in the first direction when the rope guide and the first shell are connected.

11. A protective shell for a vehicle winch, the vehicle winch comprising a rope guide, a buffer member, a cable and a connection fastener, the rope guide having a guide hole through which the cable passes, the connection fastener being at an end of the cable, the buffer member being fitted over the connection fastener, and the cable, the connection fastener and the buffer member being movable in a first direction relative to the rope guide, wherein the protective shell comprises:

a first shell having a first end and a second end that are oppositely arranged in the first direction, wherein the first end of the first shell is detachably connected to the rope guide, and the first shell comprises a through hole penetrating the first shell in the first direction; and a second shell detachably connected to the second end of the first shell to open and close the through hole, wherein:

the first end of the first shell comprises a first plug, and the first plug has at least two snap portions spaced apart from each other in a second direction orthogonal to the first direction;

the at least two snap portions are movable relative to each other have a movable position and a connection position, in the movable position, a maximum size of the at least two snap portions in the second direction is less than or equal to a size of the guide hole in the second direction, to allow the first plug to be inserted into or removed from the guide hole, and in the connection position, the maximum size of the at least two snap portions in the second direction is greater than the size of the guide hole in the second direction, to allow the first shell to be connected to the rope guide in a clamping manner.

12. The protective shell according to claim 11, wherein there are at least two first plugs spaced apart from each other in a third direction, and the third direction is orthogonal to the first direction and the second direction.

13. A winch assembly, comprising:

a vehicle winch comprising a rope guide, a buffer member, a cable and a connection fastener, the rope guide having a guide hole through which the cable passes, the connection fastener being at an end of the cable, the buffer member being fitted over the connection fastener, and the cable, the connection fastener and the buffer member being movable in a first direction relative to the rope guide; and a protective shell comprising a first shell and a second shell, the first shell having a first end and a second end that are oppositely arranged in the first direction, the first end of the first shell being detachably connected to the rope guide, the first shell comprising a through hole penetrating the first shell in the first direction, and the second shell being detachably connected to the second end of the first shell to open and close the through hole, wherein: the rope guide is arranged on a vehicle body; an end of the rope guide facing away from the vehicle body comprises a connection groove; the buffer member has a first end and a second end that are oppositely arranged in the first direction, the first end of the buffer member comprising a connection portion fitted with the connection groove to enable the rope guide and the buffer member to be connected in an insertion manner; the connection fastener has a first end and a second end that are oppositely arranged in the first direction, the first end of the connection fastener being connected to the cable; the connection fastener is movable in the first direction relative to the buffer member, to allow the second end of the connection fastener to extend and retract from the second end of the buffer member; the vehicle winch has a use state where the buffer member is separated from the rope guide and the second end of the connection fastener extends from the second end of the buffer member, and a rest state where the buffer member is inserted and connected to the rope guide and the second end of the connection fastener is retracted from the second end of the buffer member; and the protective shell is configured to separate from the vehicle winch in the use state and is configured to connect to the vehicle winch in the rest state.

14. The winch assembly according to claim 13, wherein:

the first end of the first shell comprises a first plug, and the first plug has at least two snap portions spaced apart from each other in a second direction orthogonal to the first direction;

the at least two snap portions are movable relative to each other have a movable position and a connection position, in the movable position, a maximum size of the at least two snap portions in the second direction is less than or equal to a size of the guide hole in the second direction, to allow the first plug to be inserted into or removed from the guide hole, and in the connection position, the maximum size of the at least two snap portions in the second direction is greater than the size of the guide hole in the second direction, to allow the first shell to be connected to the rope guide in a clamping manner.

15. The winch assembly according to claim 14, wherein there are at least two first plugs spaced apart from each other in a third direction, and the third direction is orthogonal to the first direction and the second direction.

16. The winch assembly according to claim 13, wherein an end surface of the first end of the first shell comprises an accommodation cavity configured to accommodate the rope guide, realizing an insertion connection between the rope guide and the first shell, and the through hole is configured to allow at least a part of the buffer member to pass through.

17. The winch assembly according to claim 16, wherein an inner wall surface of the first shell comprises an inner end surface and an inner lateral surface, the through hole is in the inner end surface, the inner lateral surface surrounds the accommodation cavity, and the inner lateral surface is provided with a protrusion configured to abut against the rope guide.

18. The winch assembly according to claim 13, wherein:

an outer wall surface of the second shell is provided with a second plug, and an extension direction of the second plug is orthogonal to the first direction; and an inner wall surface of the first shell is provided with a slot, and the second plug is inserted into the slot when the first shell and the second shell are connected.

19. The winch assembly according to claim 18, wherein:

there are at least two second plugs;

the second end of the first shell has at least two lugs protruding along the first direction and spaced apart from each other in a direction orthogonal to the first direction, and the slot is in an inner wall surfaces of each lug; and the at least two second plugs are configured to be connected to the at least two lugs in one-to-one correspondence.

* * * * *